United States Patent
Wenzel et al.

(10) Patent No.: US 8,258,779 B2
(45) Date of Patent: Sep. 4, 2012

(54) TRANSMISSION SHIFT RAIL POSITION SENSOR

(75) Inventors: Gary Herman Wenzel, Cedar Falls, IA (US); Nathan Paul DeFord, Hudson, IA (US)

(73) Assignee: Deere & Company, Moline, IL (US)

( * ) Notice: Subject to any disclaimer, the term of this patent is extended or adjusted under 35 U.S.C. 154(b) by 837 days.

(21) Appl. No.: 12/323,876

(22) Filed: Nov. 26, 2008

(65) Prior Publication Data

US 2010/0127693 A1 May 27, 2010

(51) Int. Cl.
*G01B 7/14* (2006.01)

(52) U.S. Cl. ................... 324/207.24; 324/207.2

(58) Field of Classification Search ............. 324/207.24, 324/207.2
See application file for complete search history.

(56) References Cited

U.S. PATENT DOCUMENTS

| | | | |
|---|---|---|---|
| 4,561,325 A | 12/1985 | Jester | |
| 4,592,249 A * | 6/1986 | Lehmann et al. | 74/473.1 |
| 4,610,179 A | 9/1986 | Parker | |
| 4,633,725 A | 1/1987 | Jones | |
| 4,853,629 A | 8/1989 | Rops | |
| 5,035,113 A | 7/1991 | Simonyi et al. | |
| 5,193,410 A | 3/1993 | Stine et al. | |
| 5,299,143 A * | 3/1994 | Hellinga et al. | 702/158 |
| 5,315,244 A * | 5/1994 | Griebeler | 324/207.21 |
| 5,455,509 A * | 10/1995 | Semura et al. | 324/207.24 |
| 5,743,143 A * | 4/1998 | Carpenter et al. | 324/207.24 |
| 5,867,092 A * | 2/1999 | Vogt | 340/456 |
| 6,218,829 B1 * | 4/2001 | Wittenstein et al. | 324/207.21 |
| 7,139,652 B2 | 11/2006 | Kikuchi | |
| 2005/0172746 A1 | 8/2005 | Waldow et al. | |
| 2006/0093169 A1 | 5/2006 | Takahashi et al. | |
| 2007/0017310 A1 | 1/2007 | Matsuzaki et al. | |
| 2007/0028709 A1 * | 2/2007 | Futamura et al. | 74/335 |
| 2008/0074100 A1 * | 3/2008 | Burns et al. | 324/178 |
| 2008/0074104 A1 * | 3/2008 | Sauer et al. | 324/207.22 |
| 2008/0092686 A1 * | 4/2008 | Markl | 74/470 |

FOREIGN PATENT DOCUMENTS

| | | |
|---|---|---|
| DE | 102007050531 | 4/2009 |
| EP | 1617109 | 1/2006 |
| GB | 2277784 | 11/1994 |

OTHER PUBLICATIONS

European Search Report, 7 Pages, Apr. 8, 2010.
Pepperl+Fuchs, Magnetic, Special Application Sensors; no date; 4 pages; Germany.

* cited by examiner

*Primary Examiner* — Jay Patidar
*Assistant Examiner* — David M. Schindler

(57) ABSTRACT

The invention relates to a shift rail position sensing system. There is a need for a rapid and accurate shift rail position sensing system. In a transmission shift mechanism shifts are performed by axially moving a shift rail which is slidable in a rail bore in a housing. A rail position sensing system includes a groove formed in the shift rail and a Hall effect sensor. The groove includes a curved bottom surface, a first ramp surface extending from one side of the bottom surface to an outer peripheral surface of the shift rail, and a second ramp surface extending from a second side of the bottom surface to an outer peripheral surface of the shift rail. The Hall effect sensor has a sensor shaft with an axis normal to an axis of the shift rail. The sensor shaft has a sensing tip which adjacent to and spaced apart from the groove, so that the Hall effect sensor is sensitive an entire range of positions of the shift rail.

4 Claims, 2 Drawing Sheets

TRANSMISSION SHIFT RAIL POSITION SENSOR

FIELD OF THE INVENTION

The present invention relates to a transmission shift rail position sensor.

BACKGROUND OF THE INVENTION

Certain large production tractors have transmissions which are shiftable among a plurality of shift or gear ranges. For example, on transmissions used in John Deere 7030 large-frame tractors, range shifts among five ranges are performed with a manually-actuated clutch arrangement.

It is proposed to perform such shifts electronically with a mechanism which includes a range-selection-shaft or shift rail which is translated axially to control the meshing of synchronizers and gears. The synchronizers and gears are fully meshed only within the last 1.0 mm of rail travel. It is therefore necessary to accurately sense the position of a range-selection-rail in order to prevent clutch engagement before the synchronizers are fully engaged with gears (an event which would cause damage to the drivetrain components). Therefore, a sensor is needed to sense when the rail has successfully made the transition into the selected range.

Because the rail must travel through a total distance of approximately 20 mm, it is not possible to accurately sense rail position throughout the entire travel range using a conventional inductive or Hall-effect sensor inline with the rail. Also, geometry constraints limit access to the end of the rail. Thus, a position sensor is needed which is displaced radially from the rail, and which can rapidly and accurately sense when the rail is within the last 1.0 mm of rail travel.

SUMMARY OF THE INVENTION

Accordingly, an object of this invention is to provide a system for accurately and rapidly sense the position of a transmission range shift rail.

A further object of the invention is to provide such a position sensing system which is not mounted at an end of the shift rail.

These and other objects are achieved by the present invention, wherein a transmission shift mechanism has shift ranges which are selected by axially moving a shift rail which is slidable in a rail bore in a housing. A shift rail position sensing system includes a groove formed in the shift rail and a Hall effect sensor. The groove has a curved bottom surface, a first flat ramp surface extending from one side of the bottom surface to an outer peripheral surface of the shift rail, and a second flat ramp surface extending from a second side of the bottom surface to an outer peripheral surface of the shift rail. The Hall effect sensor has a sensor shaft having an axis which is normal to an axis of the shift rail. The sensor shaft has a sensing tip which is adjacent to and spaced apart from the groove, so that the Hall effect sensor is sensitive an entire range of positions of the shift rail.

DESCRIPTION OF THE PREFERRED EMBODIMENT

Figure 1:
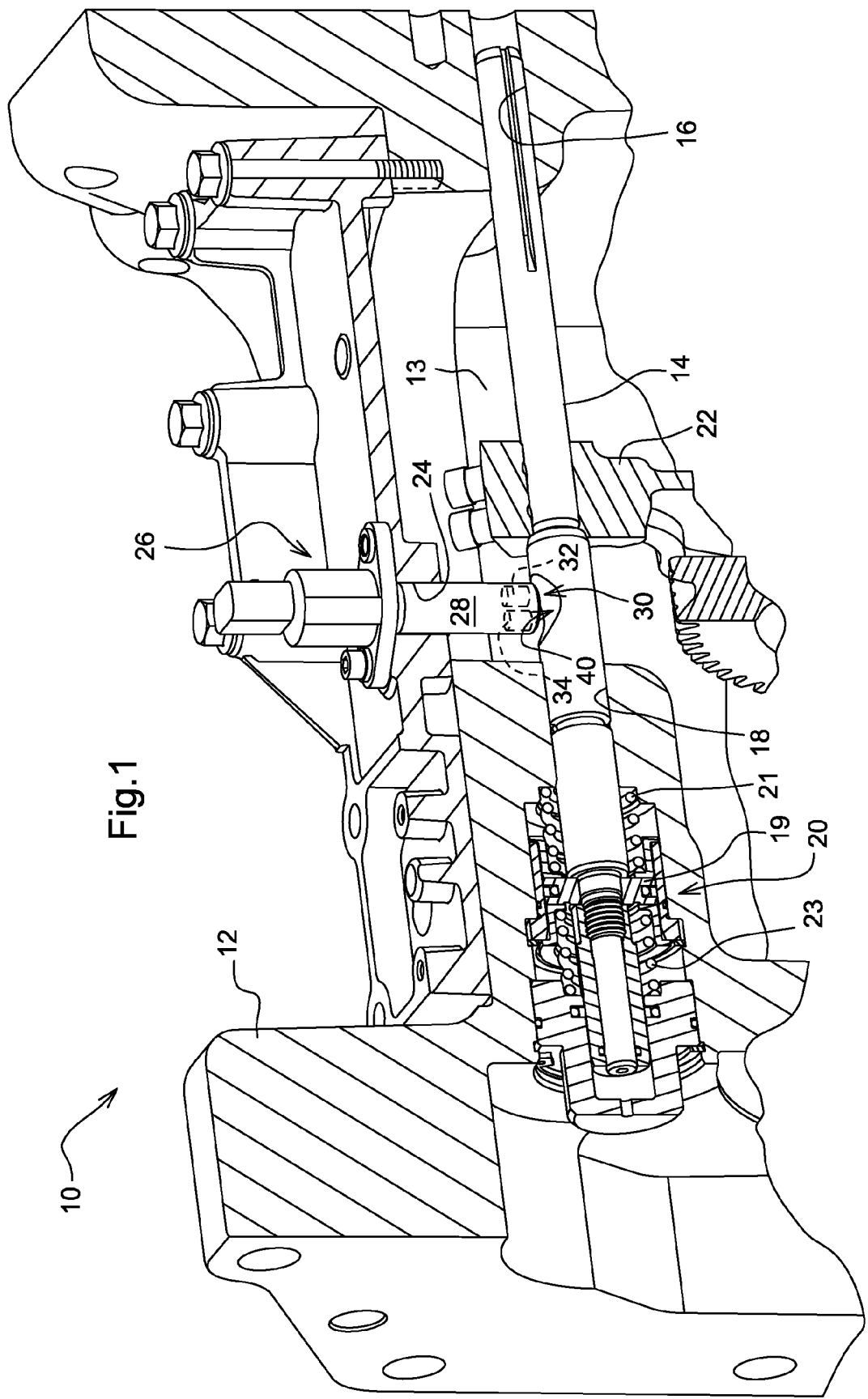
FIG. 1 is a perspective sectional view of a portion of a transmission range shift unit embodying the invention.

Referring to FIG. 1, a transmission range shift unit 10 includes a hollow housing 12 which encloses a plurality of range selector or shift rails or rails 14, one of which is shown in FIG. 1. The rail 14 slides over a distance of approximately 20 millimeters (mm) in rail bores 16 and 18 formed in the housing 12. The movement of the rail 14 is controlled by a hydraulic actuator 20. A shift fork 22 is fixed to a central part of the rail 14. The fork 22 operatively engages with transmission gears (not shown). The actuator 20 includes a piston 19 attached to an end of the shift rail 14. Hydraulic pressure will be supplied to either side of the piston 19 to move the shift rail to the desired position. When pressure is not applied to the piston 19, the shift rail 14 is held in a neutral position by springs 21 and 23. The housing forms a chamber 13. The shift fork 22 is attached to the shift rail 14 within the chamber 13.

The housing 12 also forms a sensor bore 24. The sensor bore 24 has an axis which intersects the rail 14, and is preferably oriented at a right angle with respect to the longitudinal axis of the rail 14. The sensor bore 24 intersects or opens into the chamber 13. A Hall effect position sensor 26 is threadably mounted in the bore 24. Sensor 26 includes a cylindrical housing or shaft 28 which extends towards the rail 14. As is well known, inside and near the inner end 30 of the housing 28 is placed a permanent magnet 32 and a Hall effect sensor element 34. The Hall effect sensor element 34 is preferably analog and back-biased. A groove or recess 40 is formed in the side of the shift rail 14 in close proximity to the end 30 of the housing 28.

Figure 2:
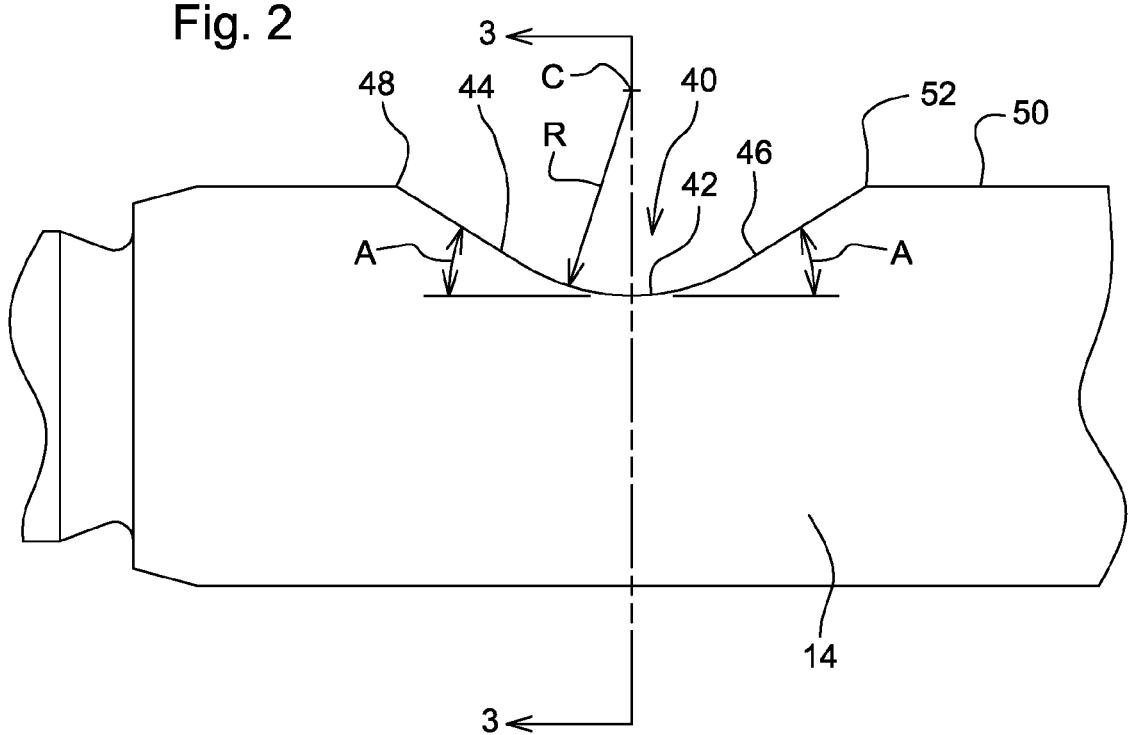
FIG. 2 is an enlarged detailed sectional view of a groove portion of the shift rail of FIG. 1.
Figure 3:
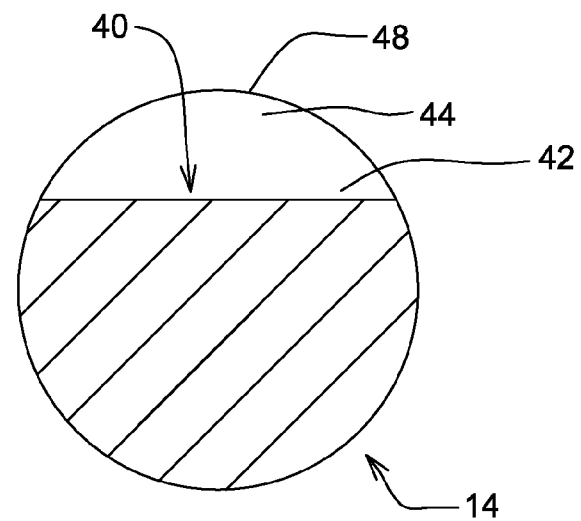
FIG. 3 is a sectional view along lines 3-3 of FIG. 2.

As best seen in FIGS. 2 and 3, the groove 40 is preferably symmetrical about a central plane P. The bottom center surface 42 of the groove may be flat or curved. Preferably, surface 42 is curved and upwardly concave. The groove 40 also includes a first flat ramp surface 44 and a second flat ramp surface 46. The center bottom surface 42 has a center of curvature C located in plane P and a radius of curvature R of preferably about 11.25 mm. The ramp surfaces 44 and 46 are oriented at an angle A of preferably approximately 33 degrees with respect to a main axis of the rail 14. The ramp surfaces 44 and 46 extend from the bottom surface 42 to outer edges 48 and 52 which intersect or join with the outer peripheral surface 50 of the shift rail 14. The distance between the outer edges 48 and 52 is preferably about 25.72 mm, and should be about the same as the maximum distance the shift rail 14 travels over as it moves the shift fork 22 to perform transmission shifts. Surfaces 42, 44 and 46 are preferably formed by milling operations. The exact shape and dimensions of the groove 40 can be adapted for different applications.

The poles of the magnet 32 are preferably located along the major axis of the housing 28, perpendicular to the nominal outside diameter of the rail 14. The magnet 32 has a magnetic field through which extends the portion of the rail 14 which includes the groove 40, so that movement of the rail 14 produces changes in the magnetic field. As the rail 14 moves left and right relative to the sensor 26 the air gap between the sensor 26 and the contour of the groove 40 varies. Air gap changes create varying levels of magnetic flux density at the Hall-effect sensor 34, and the sensor modulates its output voltage based on the flux density at the Hall-effect element 34. This position signal generated by sensor 34 can be used by a transmission controller (not shown) as follows. The transmission controller (not shown) will disengage a traction clutch (not shown) before the range shift unit 10 is commanded to perform a range shift. After the range shift is finished the clutch will modulate back to system pressure. The time to complete a shift will depend on current range and commanded range, temperature, top shaft RPM, wheel speed, and load. With the above described shift rail sensor system, the position of the grooves in each shift rail can be accurately and quickly monitored so that the clutch can be engaged immediately after the shift has been completed. This feedback will minimize the amount of delay of clutch engagement for all conditions.

The resulting position sensing system is impervious to wear affects because there are no points of contact between the sensor and the rail. This sensing system also provide a continuous, rather than a discrete or step-wise output signal. Also, this system does not require unusually tight positional tolerances between the rail and the sensor. This capability directly reduces manufacturing costs as machining tolerances are not excessively small.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A rail position sensing system for sensing a position of shift rail which is slidable in a rail bore in a housing, the rail position sensing system, comprising:

a groove formed in the shift rail, the groove including a curved bottom surface, a first ramp surface extending from one side of the bottom surface to an outer peripheral surface of the shift rail, and a second ramp surface extending from a second side of the bottom surface to an outer peripheral surface of the shift rail;

the housing including a sensor bore, the sensor bore having an axis which intersects the rail;

a sensor housing mounted in the sensor bore, the sensor housing having an end facing towards the shift rail and spaced apart therefrom;

a magnet mounted inside the sensor housing near said end, the magnet generating a magnetic field, a portion of the rail which includes the groove extending into the magnetic field, movement of the rail producing changes in said magnetic field; and a Hall effect sensor mounted inside the sensor housing near said end so that the Hall effect sensor detects changes in said magnetic field through a range of positions of the shift rail.

2. The rail position sensing system of claim 1, wherein: the bottom surface is curved and concave in a direction facing the sensor.

3. The rail position sensing system of claim 1, wherein: the bottom surface and the ramp surfaces are formed by a milling operation.

4. The rail position sensing system of claim 1, wherein: the housing includes a chamber;

a shift fork is attached to the shift rail within said chamber; and the sensor bore intersects with said chamber.

* * * * *